United States Patent
Walls

(10) Patent No.: US 12,246,793 B2
(45) Date of Patent: *Mar. 11, 2025

(54) MULTI-WHEEL TRANSPORTATION VEHICLES AND RELATED METHODS

(71) Applicant: Scott D. Walls, Charlotte, NC (US)

(72) Inventor: Scott D. Walls, Charlotte, NC (US)

(73) Assignee: Scott D. Walls, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,639

(22) Filed: Apr. 4, 2023

(65) Prior Publication Data
US 2023/0234666 A1 Jul. 27, 2023

Related U.S. Application Data

(63) Continuation-in-part of application No. 17/495,782, filed on Oct. 6, 2021, now Pat. No. 11,649,008.
(Continued)

(51) Int. Cl.
*B62K 5/027* (2013.01)
*B62J 43/16* (2020.01)
(Continued)

(52) U.S. Cl.
CPC ............ *B62K 5/027* (2013.01); *B62J 43/16* (2020.02); *B62J 43/20* (2020.02); *B62K 5/06* (2013.01);
(Continued)

(58) Field of Classification Search
CPC .......... B62K 5/027; B62K 5/06; B62K 25/26; B62K 2025/047; B62J 43/20; B62J 43/16; B62M 7/12; B60G 17/005
(Continued)

(56) References Cited

U.S. PATENT DOCUMENTS 4,429,760 A * 2/1984 Koizumi ................ B62K 5/027
280/282
7,243,765 B2 * 7/2007 Marcacci ................ B62K 5/05
188/300
(Continued)

OTHER PUBLICATIONS

Tilting Vehicles Blog: Motorized—2 wheels rear, <https://tiltingvehicles.blogspot.com/search/label/Motorized%20-%202%20wheels%20rear?updated-max=2011-11-01T19:56:00-07:00&max-results=20&start=20&by-date=false> webpage accessed on Sep. 17, 2021.

*Primary Examiner* — Paul N Dickson
*Assistant Examiner* — Caitlin Anne Miller
(74) *Attorney, Agent, or Firm* — Michael Best & Friedrich LLP

(57) ABSTRACT

Transportation vehicles, suspension systems and related methods are provided herein. A three wheeled vehicle can include a frame having first and second sides and front and rear ends and a steerable front wheel secured to the front end of the frame. The vehicle can also include a first trailing wheel arm with a first rear wheel and a second trailing wheel arm with a second rear wheel. The vehicle can include a horizontal linkage having first and second ends and a midsection therebetween. The horizontal linkage can be pivotably connected to a pintle on the frame at the midsection with the horizontal linkage linked to an underside of the first trailing wheel arm between the first wheel and the central suspension joint and linked to an underside of the second trailing wheel arm between the second wheel and the central suspension joint.

20 Claims, 15 Drawing Sheets

Related U.S. Application Data

(60) Provisional application No. 63/088,153, filed on Oct. 6, 2020.

(51) Int. Cl.
| | |
|---|---|
| *B62J 43/20* | (2020.01) |
| *B62K 5/00* | (2013.01) |
| *B62K 5/06* | (2006.01) |
| *B62K 25/04* | (2006.01) |
| *B62K 25/26* | (2006.01) |
| *B62M 7/12* | (2006.01) |

(52) U.S. Cl.
CPC ............ *B62K 25/26* (2013.01); *B62M 7/12* (2013.01); *B62K 2005/001* (2013.01); *B62K 2025/047* (2013.01)

(58) Field of Classification Search
USPC ........................................................ 180/214
See application file for complete search history.

(56) References Cited

U.S. PATENT DOCUMENTS

| | | | |
|---|---|---|---|
| 7,494,141 B2 * | 2/2009 | Bouton | B62D 9/02 |
| | | | 280/5.509 |
| 8,641,064 B2 | 2/2014 | Krajekian | |
| 8,915,323 B2 | 12/2014 | Tsujii et al. | |
| 9,283,989 B2 | 3/2016 | Spahl et al. | |
| 10,023,019 B2 | 7/2018 | Spahl et al. | |
| 10,076,939 B2 * | 9/2018 | Simon | B60G 21/055 |
| 11,292,517 B2 | 4/2022 | Yu | |
| 2010/0090432 A1 * | 4/2010 | Hauser | B60G 17/005 |
| | | | 403/109.7 |

* cited by examiner

MULTI-WHEEL TRANSPORTATION VEHICLES AND RELATED METHODS

RELATED APPLICATION

This application is a continuation-in-part patent application which claims the benefit of U.S. Provisional Patent Application Ser. No. 63/088,153, filed Oct. 6, 2020, the disclosure of which is incorporated herein by reference in its entirety and claims the benefit of U.S. patent application Ser. No. 17/495,782, filed Oct. 6, 2021, the disclosure of which is also incorporated herein by reference in its entirety.

TECHNICAL FIELD

The present subject matter relates to multi-wheeled vehicles, suspensions systems, and related methods. In particular, the present subject matter relates to three-wheeled vehicles that provide unique linkages between the wheels to provide a smoother ride to the user of the vehicle.

BACKGROUND

In recent years, interest in motor vehicles with innovative designs has grown in view of the continued expansion of urban areas, the large number of vehicles operating in these areas, and the problems associated therewith, including, for example, traffic jams, parking shortages, and environmental pollution.

In recent years, various attempts have therefore been made to develop a laterally tiltable multi-track vehicle, having either three or four wheels, in which the entire vehicle or a part thereof may tilt in toward a rotation center (e.g., a curve bend inner side) in a similar manner to a bicycle or motorcycle. In other words, both the body and wheels of a tiltable vehicle may lean into a curve during cornering such that the wheels stay parallel to the body throughout the curve. Accordingly, like a bicycle or motorcycle, such vehicles are statically in an instable equilibrium and would fall over without any external correction by the driver or another device. Unlike a bicycle or motorcycle, however, in which the vehicle can be easily stabilized by moving the center of gravity of the driver (i.e., via input from the driver), such tiltable vehicles generally require suspensions that can help stabilize the vehicle during cornering, or, for example, on banked roads.

Accordingly, various innovative suspensions have also been developed for laterally tiltable multi-track vehicles. Such suspensions, for example, generally incorporate a balancing device that can create a torque to influence the leaning angle of the vehicle. Additionally, for safety and ride comfort, such suspensions should also provide a spring/damping function between the body of the vehicle and the wheels of the vehicle, similar to the suspension spring/damper elements of a conventional motor vehicle.

While many have tried, a vehicle has not been developed that clearly provides rear wheel suspension that permits a more stable and comfortable ride and can provide easy adjustability as to the movement of the back wheels to adjust to both the road and how the vehicle responds to the road.

As such, a need exists for improving the suspension of a tiltable three-wheel transportation vehicle.

SUMMARY

The present subject matter relates to three-wheeled transportation vehicles and suspension systems as well as methods related thereto. In particular, the present subject matter provides three-wheeled vehicles with two rear wheels that permit the rear wheels to pivot without damaging the frame of the vehicle with the rear wheels being linked together such that the rear wheels move inversely to each other.

Thus, it is an object of the presently disclosed subject matter to provide three-wheeled transportation vehicles and suspension systems as well as methods related thereto. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow proceeds.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1:
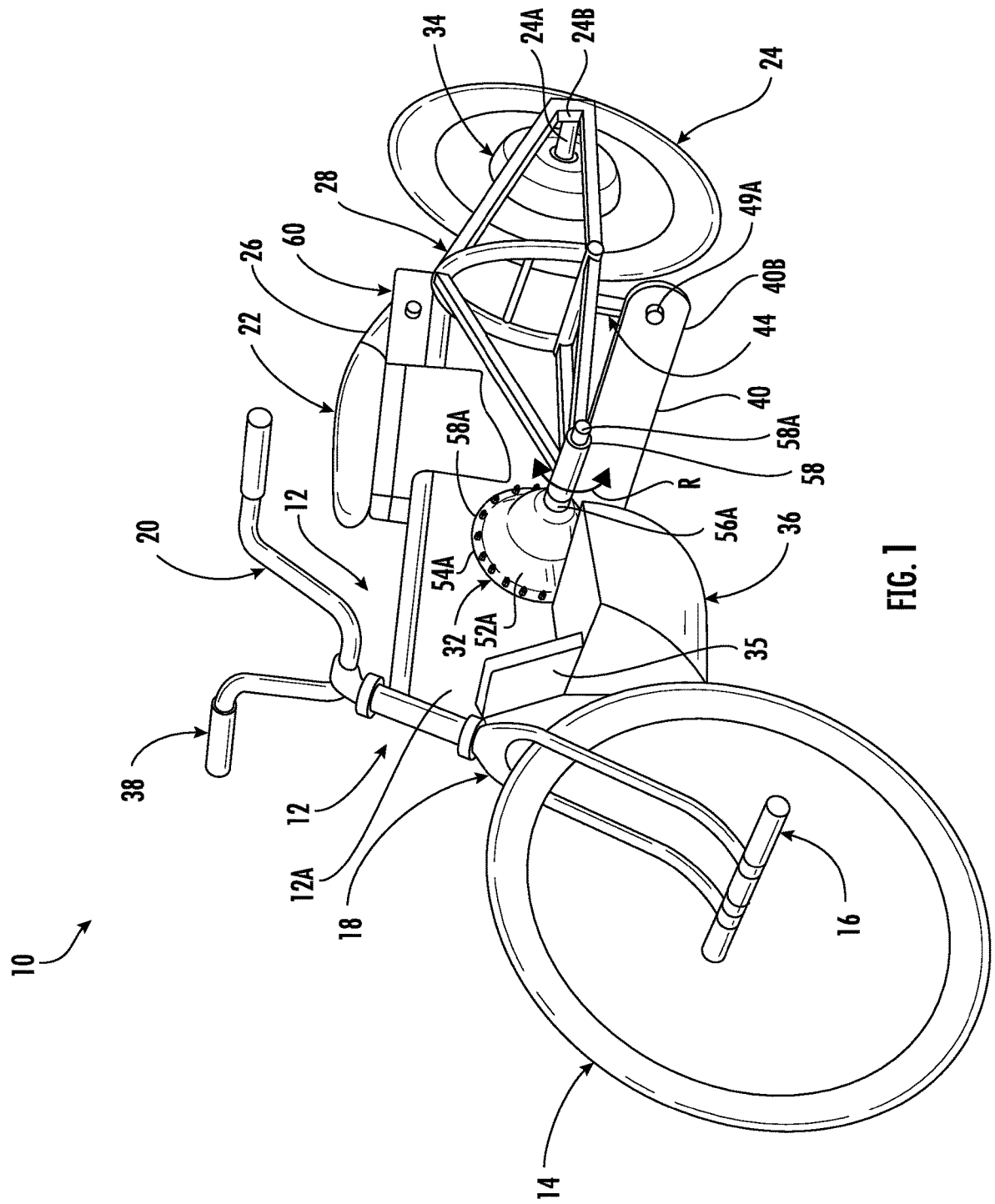
FIG. 1 illustrates a perspective view of an embodiment of a transportation vehicle according to the present subject matter.
Figure 2:
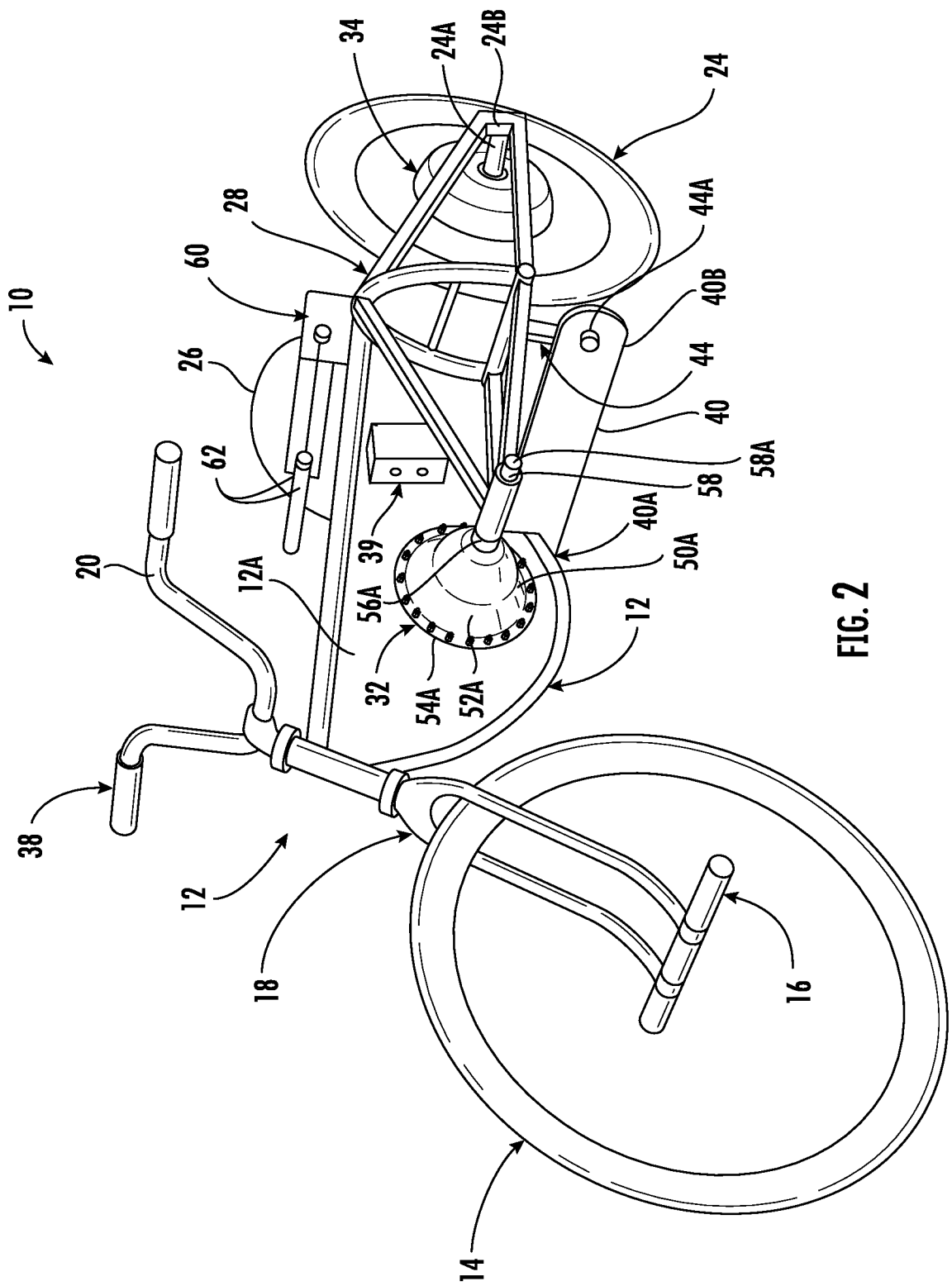
FIG. 2 illustrates a perspective view of the embodiment of the transportation vehicle according to FIG. 1 with some components removed for clarity.

Repeat use of reference characters in the present specification and drawings is intended to represent the seam or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. It is to be understood by one of ordinary skill in the art that the present discussion is a description of exemplary embodiments only and is not intended as limiting the broader aspects of the present subject matter, which broader aspects are embodied in exemplary constructions.

Although the terms first, second, right, left, front, back, top, bottom, etc. may be used herein to describe various features, elements, components, regions, layers and/or sections, these features, elements, components, regions, layers and/or sections should not be limited by these terms. These terms are only used to distinguish one feature, element, component, region, layer, or section from another feature, element, component, region, layer, or section. Thus, a first feature, element, component, region, layer, or section discussed below could be termed a second feature, element, component, region, layer, or section without departing from the teachings of the disclosure herein.

Similarly, when a feature or element is being described in the present disclosure as "on" or "over" another feature or element, it is to be understood that the features or elements can either be directly contacting each other or have another feature or element between them, unless expressly stated to the contrary. Thus, these terms are simply describing the relative position of the features or elements to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements, or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted, or simplified to facilitate explanation of the subject matter disclosed herein. Thus, the features, elements or components illustrated in the figures are schematic in nature and their shapes and/or positions are not intended to illustrate the precise configuration of the subject matter and are not necessarily intended to limit the scope of the subject matter disclosed herein unless it specifically stated otherwise herein.

As used herein, the term a "plurality" means two or more.

As used herein, the terms such as "include," "including," "contain," "containing," "having," and the like mean "comprising." The present disclosure also contemplates other embodiments "comprising," "consisting of," and "consisting essentially of," the embodiments or elements presented herein, whether explicitly set forth or not.

As used herein, the term "a," "an," "the" and similar terms used in the context of the disclosure (especially in the context of the claims) are to be construed to cover both the singular and plural unless otherwise indicated herein or clearly contradicted by the context. In addition, "a," "an," or "the" means "one or more" unless otherwise specified.

As used herein, the term "or" can be conjunctive or disjunctive.

As used herein, the term "substantially" means to a great or significant extent, but not completely.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In one aspect, the term "about" refers to any values, including both integers and fractional components that are within a variation of up to ±10% of the value modified by the term "about." Alternatively, "about" can mean within 3 or more standard deviations, per the practice in the art. Alternatively, such as with respect to biological systems or processes, the term "about" can mean within an order of magnitude, in some embodiments within 5-fold, and in some embodiments within 2-fold, of a value. As used herein, the symbol "~" means "about" or "approximately."

All ranges disclosed herein include both end points as discrete values as well as all integers and fractions specified within the range. For example, a range of 0.1-2.0 includes 0.1, 0.2, 0.3, 0.4 . . . 2.0. If the end points are modified by the term "about," the range specified is expanded by a variation of up to ±10% of any value within the range or within 3 or more standard deviations, including the end points. Thus, it is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

According to one exemplary embodiment, the present disclosure comprises a multi-wheel transportation vehicle comprising one or more independent electric hub motors operatively mounted at respective wheels of the vehicle.

As disclosed herein, the present disclosure can comprise an improved motorized three wheeled vehicle. The exemplary method of achieving improved efficiency is to employ a three wheeled platform that permits vertical articulations in the rear wheels that correspond with each other permitting a shift in the center of gravity of the vehicle unlike conventional tricycles, which have limitations in that tricycles have the tendency to turn over when exposed to lateral acceleration, for example, when turning. The three-wheeled vehicle as disclosed herein acts to retain the side-to-side center of gravity along the central axis of the vehicle at all times.

The structure of the vehicle disclosed herein comprises one wheel at the front and two wheels at the rear. The two rear wheels articulate in an inverse manner, such that when one rear wheel articulates upward, the opposite rear wheel is constrained to articulate downward by the same amount, while both rear wheels remain parallel to each other in their vertical orientation and to the frame of the vehicle. The suspension arrangement of the rear wheels includes a series of mechanical linkages that transfer tire loading into the vehicle frame to permit the vehicle to achieve a vehicle attitude that allows the vehicle to tilt in turns. Each rear wheel is mounted on one end of a trailing wheel arm. The opposite end of each trailing arm is rotatably connected, or hinged, to one or more transverse arm shafts that can be transversely rigidly fixed to the frame of the vehicle. This arrangement enables the rear wheels to articulate rotatably about the one or more transverse arm shafts, while the rear wheels remain vertically parallel to the frame.

The rear wheel articulation is constrained to move opposedly, and to carry the vehicle weight by a horizontal transverse linkage. This horizontal linkage can comprise a bar, rod or beam that is pivotably connected, or hinged, at its center to the frame of the vehicle. The ends of the horizontal linkage can be linked to the intermediate area of the trailing wheel arms by tension links or suspension springs. Motive power for the vehicle can be provided by a battery powered electric hubmotor located on the axle of one or more of the vehicle wheels. In some embodiments, motive power for the vehicle can be provided by a battery powered electric hubmotor located on the axle of all the vehicle wheels to provide all-wheel power to the vehicle.

Referring to FIGS. 1-6, a transportation vehicle, generally designated 10, is provided. The vehicle 10 can be a three wheeled transportation vehicle. The vehicle 10 can comprise a frame 12 having a front wheel 14 on an axle 16 within a fork 18 that can be steered by handlebars 20. While shown in this embodiment with handlebars 20, the vehicle 10 can utilize other steering systems, such as a steering wheel or single or dual control sticks. In some embodiments, the steering mechanism can swing, slide, or retract, for example, to facilitate operator access and egress. A seat 22 can be secured to the frame 12. In some embodiments, the seat and frame configuration can provide a recumbent seat. The vehicle 10 can include a first rear wheel 24 and a second rear wheel 26. The first rear wheel 24 can be mounted on an axle 24A in a first trailing wheel arm 28 and the second rear wheel 26 can be mounted on an axle 26A in a second trailing wheel arm 30 (see FIG. 5). The first and second trailing wheel arms 28, 30 can be rotatably secured to a central suspension joint 32 such that each of the first and second trailing wheel arms 28, 30 can rotate about one or more shafts of the central suspension joint 32 in directions R to provide a general vertical displacement of the first and second rear wheels 24, 26. The first and second trailing wheel arms 28, 30 are constrained to swing inversely to each other as will be explained further below. Wheel axle drop outs 24B, 26B can be used to secure and release the axles 24A, 26A and the respective rear wheels 24, 26 into and from the respective first and second trailing wheel arms 28, 30.

Figure 4:
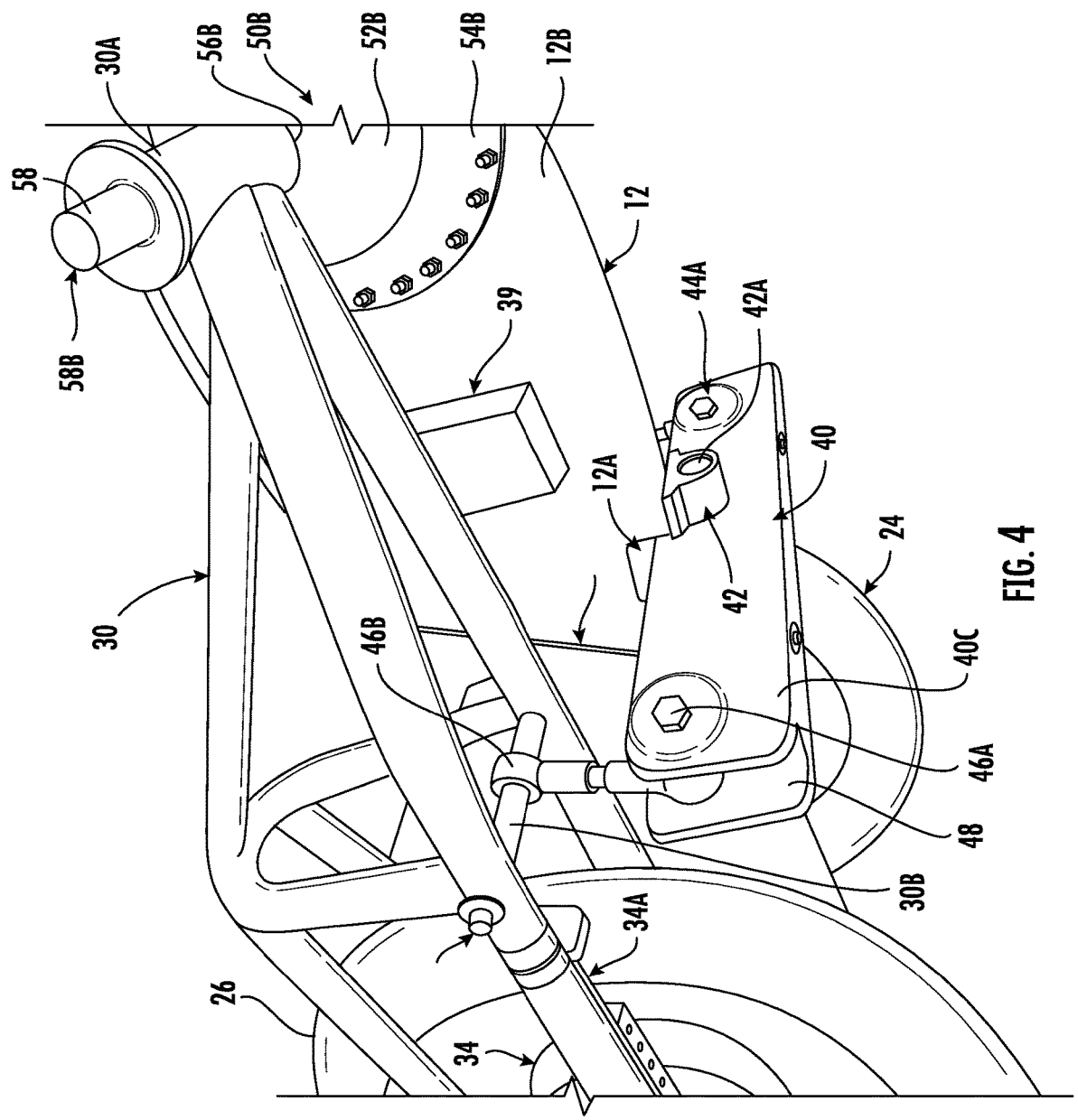
FIG. 4 illustrates a bottom side perspective view of another portion of the embodiment of the transportation vehicle according to FIG. 1 showing an embodiment of a horizontal linkage according to the present subject matter.
Figure 5:
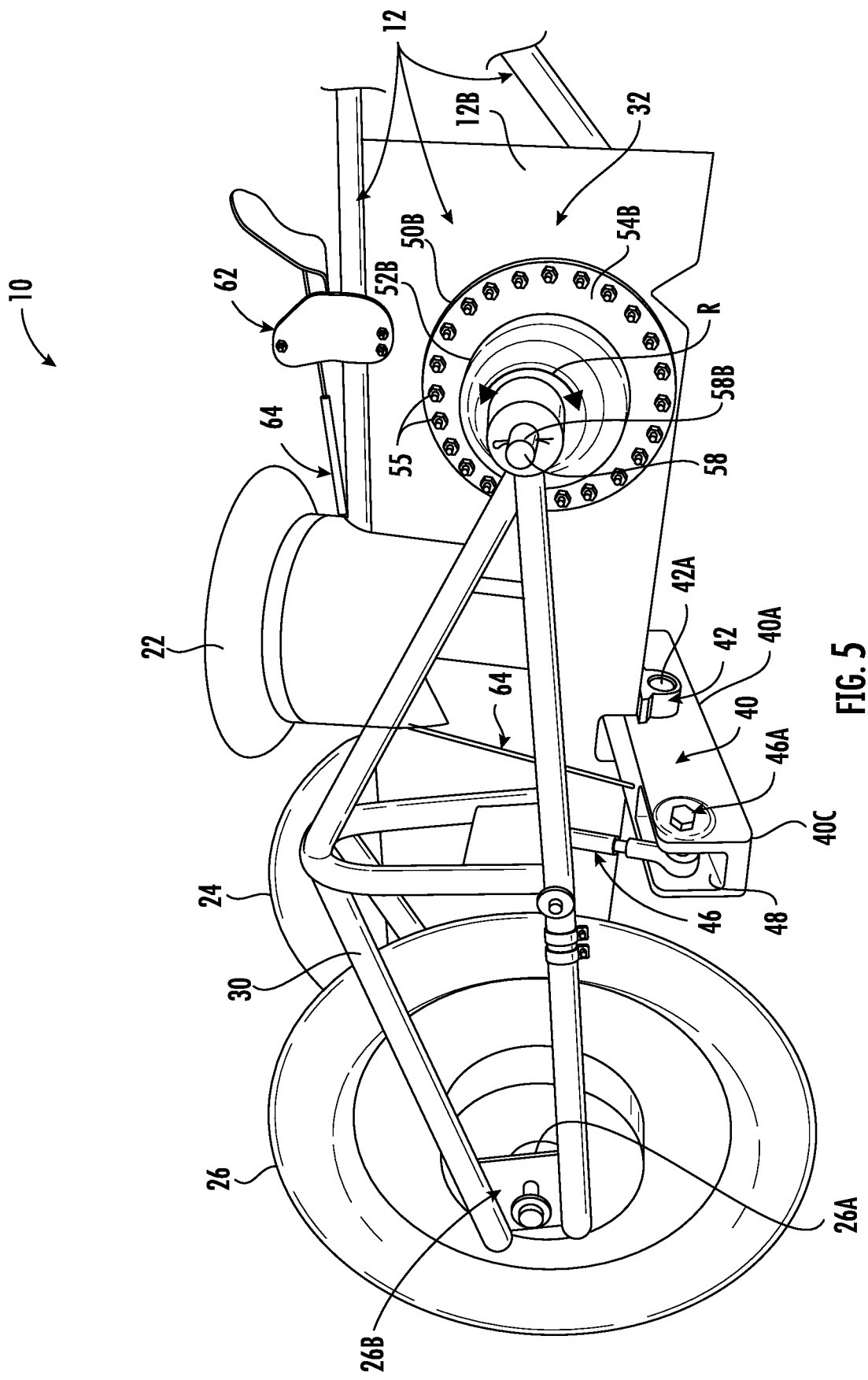
FIG. 5 illustrates a rear side perspective view of another portion of the embodiment of the transportation vehicle according to FIG. 1.

The vehicle 10 can be an electric powered vehicle. For example, in some embodiments, the vehicle 10 can comprise one or more electric hub motors 34 that can be used to provide motive power. The electric hub motors 34 can be configured within the wheel hubs of one, two, or all three wheels. For example, in some embodiments as shown in FIGS. 1 and 5, the electric hub motors 34 can be within the rear wheels 24, 26. Motive torque of the electric hub motors 34 can express itself through axle torque. The wheel axles 24A, 26A can be constrained from spinning, thereby converting the motor torque into traction at the tire tread. A torque arms 34A as shown in FIG. 4 can be rigidly attached to the axles 24A, 26A at one end and connected to the respective first or second trailing wheel arms 28, 30 at the opposite end to transmit the motor torque into the first and second trailing wheel arms 28, 30. Alternatively, a clamping axle dropout (not shown) can be applied to rigidly constrain both ends of each axle from spinning.

To provide power to the electric hub motors 34, one or more battery banks can be located within battery boxes 36 that can be rigidly attached to the frame 12 behind the front wheel 14, for example. Footrests 35 can be provided on the vehicle 10. In some embodiments, the footrests 35 can be rigidly but adjustably affixed to the top edges of the battery boxes 36 to allow for adjustment for varied rider height. In some embodiments, the footrests 35 instead can be rigidly but adjustably affixed to the frame 12.

To control the power generated by the electric hubmotors 34, a throttle 38 is provided that is in operable communication with one or more controllers 39 that is operably connected to the electric hub motors 34. The one or more controllers 39 can thereby provide throttle controlled electric power to the hubmotors 34 as well as provide power for accessories. Using the battery powered electric hubmotors 34, the throttle 38 and one or more controllers 39, the user of the vehicle 10 can provide motive power to the vehicle 10 and control the speed of the vehicle 10.

The connection of the first or second trailing wheel arms 28, 30 to the frame 12 and their controlled movement will now be described in more detail. As stated above, the first and second trailing wheel arms 28, 30 can be rotatably secured the central suspension joint 32 and can be constrained to swing inversely to each other. The vehicle 10 can comprise a horizontal linkage 40 that rotatably connects to the frame 12 and is linked to both the first and second trailing wheel arms 28, 30 on either side of the frame 12. In some embodiments, the horizontal linkage 40 can be connected to the first and second trailing wheel arms 28, 30 at their intermediate lengths between their connections to the central suspension joint 32 and the respective rear wheels 24, 26. The horizontal linkage 40 can link the first and second trailing wheel arms 28, 30 together such that the first and second trailing wheel arms 28, 30 move inversely to one another. For example, if the rear wheel 24 is pushed upward, the first trailing wheel arm 28 rotates upward about the shaft of the central suspension joint 32 and the horizontal linkage 40 is forced upward on the side that it is connected to first trailing wheel arm 28 while the horizontal linkage 40 is forced downward on the side that it is connected to second trailing wheel arm 30 as the horizontal linkage 40 is rotated around its connection to the frame 12 that acts as a fulcrum. The downward movement of the side of the horizontal linkage 40 connected to the second trailing wheel arm 30 brings the second trailing wheel arm 30 and the rear wheel 26 downward by an amount proportional to the upward movement of the rear wheel 24. Thus, as first trailing wheel arm 28 articulates in a first direction, the horizontal linkage 40 is pivoted about the connection to the frame 12 causing the second trailing wheel arm 30 to articulate in a second opposing direction.

Figure 3:
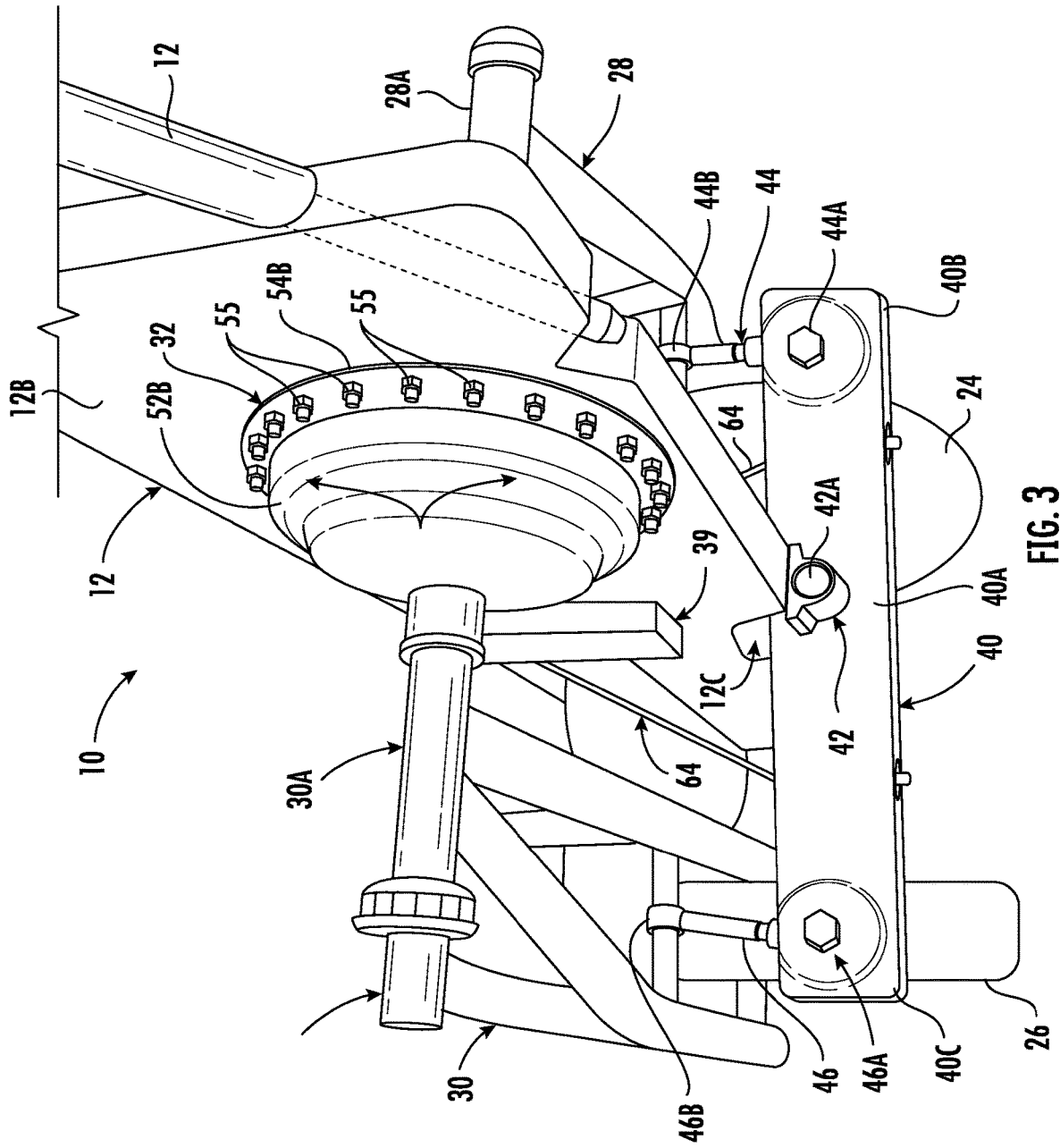
FIG. 3 illustrates a bottom side perspective view of a portion of the embodiment of the transportation vehicle according to FIG. 1 showing an embodiment of a horizontal linkage according to the present subject matter.

As shown in FIGS. 1-6, the horizontal linkage 40 can be pivotably connected to the frame 12 at a midsection 40A while the horizontal linkage 40 can be linked to the first trailing wheel arm 28 between the first rear wheel 24 and the central suspension joint 32 proximal to a first end 40B of the horizontal linkage 40 and the horizontal linkage 40 can be linked to the second trailing wheel arm 30 between the second wheel 26 and the central suspension joint 32 proximal to the second end 40C of the horizontal linkage 40. In some embodiments as shown in FIGS. 3-5, the horizontal linkage 40 can be secured to the frame 12 by a connection such as a shaft 42A and cradle 42 such that horizontal linkage 40 is pivotable about the connection to the frame 12. The shaft 42A and cradle 42 firmly hold the horizontal linkage 40 to the frame 12 and function as a fulcrum to permit the horizontal linkage 40 to rotate about the shaft 42. In the embodiment shown, the frame 12 can have a linkage indention 12C that provides clearance space above the horizontal linkage 40 when secured by the shaft 42A and cradle 42 to permit the back and forth pivoting about the shaft 42A and cradle 42. In some embodiments as shown, the horizontal linkage 40 can be secured to the frame 12 at a position in which the horizontal linkage 40 extends beneath the first and second trailing wheel arms 28, 30.

Figure 12:
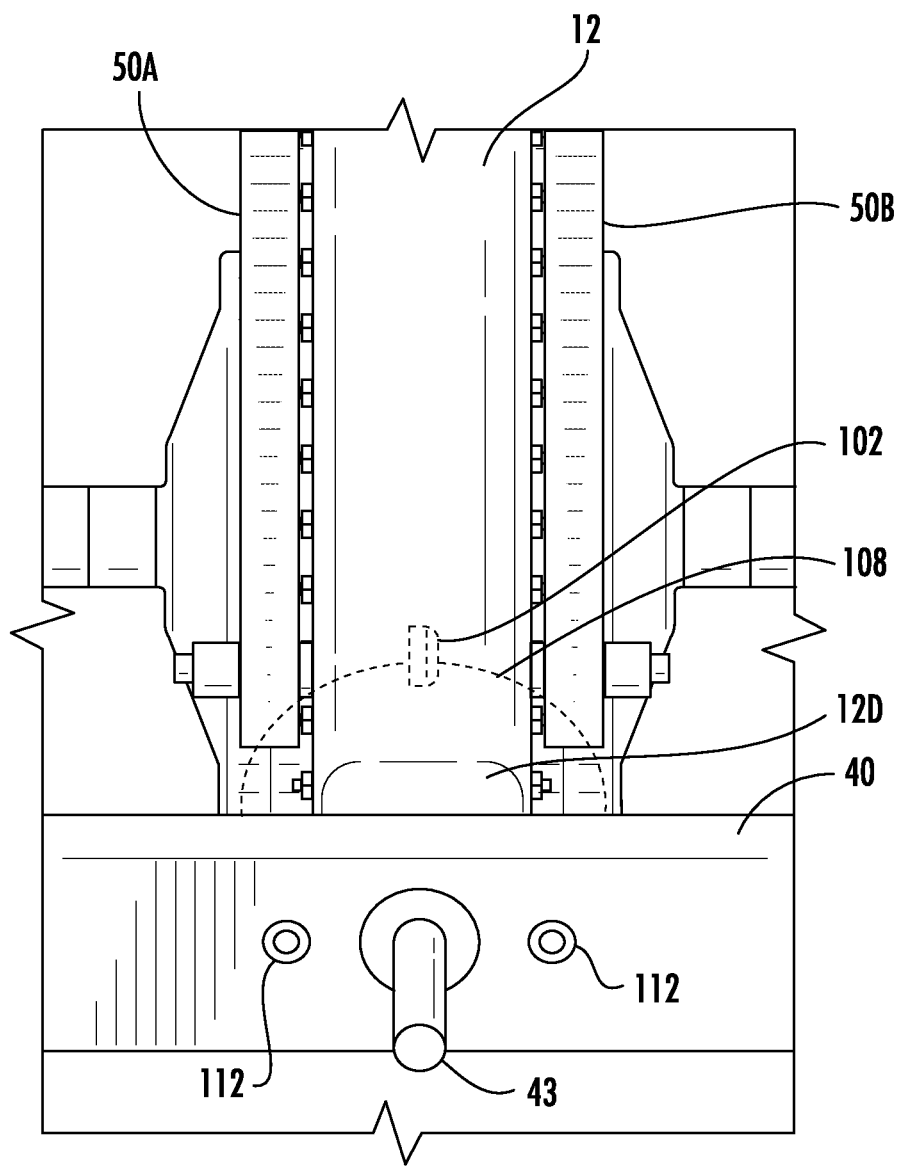
FIG. 12 illustrates a rear perspective view of a portion of an embodiment of horizontal linkage that can be used in conjunction with a transportation vehicle according to the present subject matter.

In some embodiments as shown in FIG. 12, the horizontal linkage 40 can be secured to the frame 12 by a pintle 43 that extends outward from a rear end 12D of the frame 12 such that the horizontal linkage 40 is pivotable about the connection to the frame 12. Thereby, the pintle 43 can also function as a fulcrum to permit the horizontal linkage 40 to rotate about the pintle 43. Having the horizontal linkage 40 pivotably secured to the pintle 43 at the rear end 12D of the frame 12 provides more options for the operation of the horizontal linkage and related operational systems or subsystems. For example, being pivotably secured to such a pintle 43 can permit the attachment of a cam clamp suspension locking system, explained in more detail below, that includes a cam 102 and a lock disc 108 secured by fastener 112 to the horizontal linkage 40 as shown in dotted lines in FIG. 12.

As shown in FIGS. 1-6, the horizontal linkage 40 can be linked to the first trailing wheel arm 28 by a first tension link 44 and the horizontal linkage 40 can be linked to the second trailing wheel arm 30 by a second tension link 46. In some embodiments, the first and second tension link 44, 46 can be loosely secured by fasteners 44A, 46A to the horizontal linkage 40. For example, the horizontal linkage 40 can have recesses 48 on both ends 40B, 40C for receiving the respective first and second tension links 44, 46 with the fasteners 44A, 46A holding the respective first and second tension links 44, 46 in the recesses 48 of the horizontal linkage 40. Additionally, first tension link 44 can be loosely secured to a shaft 28B of the first trailing wheel arm 28 at an end receiver 44B and the second tension link 46 can be loosely secured to a shaft 30B of the first trailing wheel arm 30 at an end receiver 46B. In this manner, the first and second tension links 44, 46 are provided with flexibility to move with horizontal linkage 40 and the respective first and second trailing wheel arms 28, 30 as the first and second trailing wheel arms 28, 30 rotationally articulate about the central suspension joint 32. In an alternative embodiment, the horizontal linkage 40 can be linked to the first and second trailing wheel arms 28, 30 by springer-type suspension linkage at the rear end of both trailing arms as discussed in more detail further below in reference to FIGS. 9.

Figure 9:
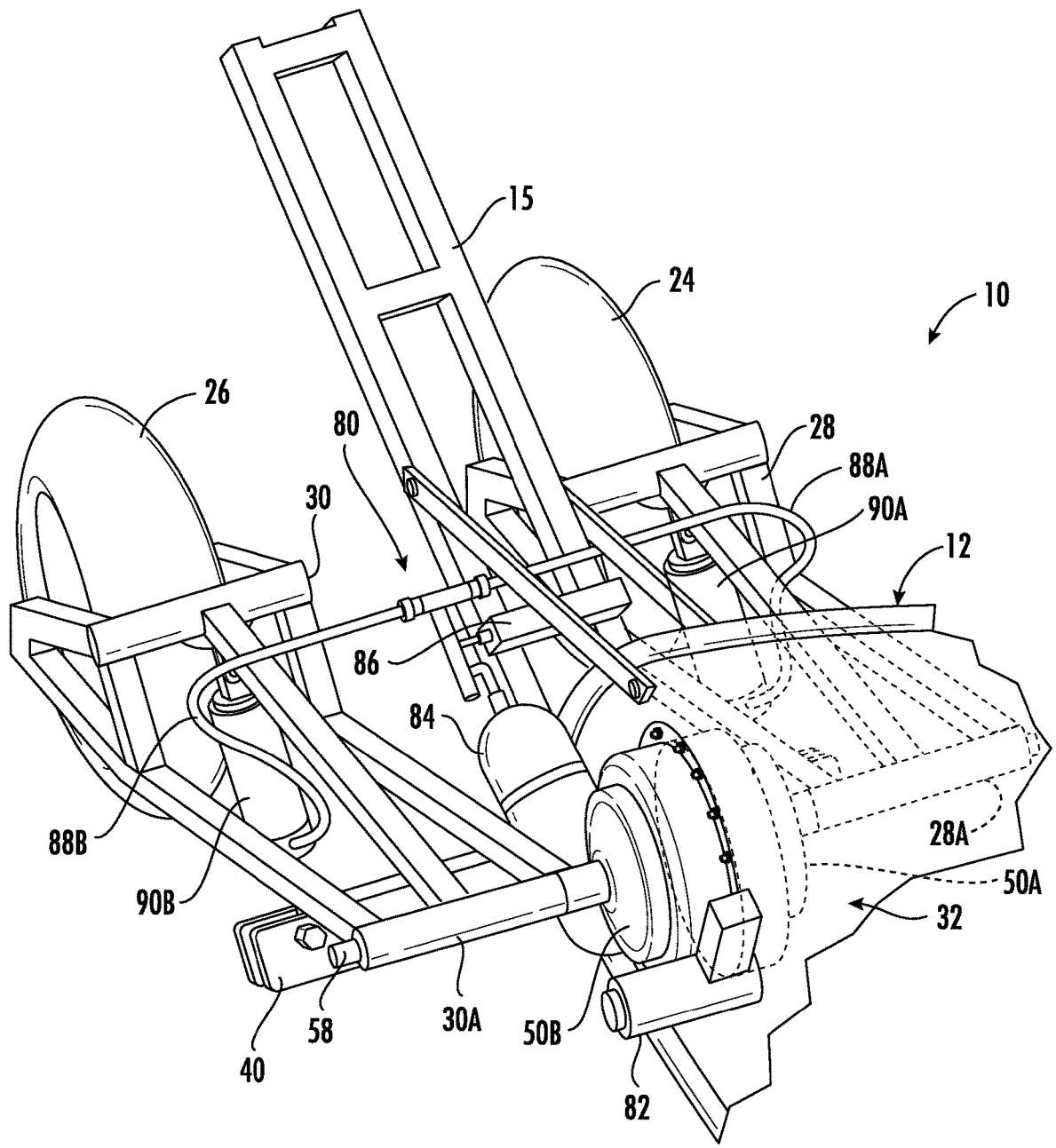
FIG. 9 illustrates a side perspective view of a portion of an embodiment of a transportation vehicle according to the present subject matter.

Referring to FIG. 9, in some embodiments, the horizontal linkage 40 can be linked to the first and second trailing wheel arms 28, 30 by springer-type suspension linkage, such as a suspension spring. A suspension spring can compress under an instantaneous bump such as hitting a rock in a roadway without causing the horizontal linkage 40 to pivot which would lead to an inverse reciprocal movement of the other trailing wheel arm and wheel. In some embodiments, the suspension springs that provide the links between horizontal linkage 40 and the first and second trailing wheel arms 28, 30 can comprise mechanical suspension springs that use compress or tension springs therein. In some embodiments, the suspension springs that provide the links between horizontal linkage 40 and the first and second trailing wheel arms 28, 30 can comprise hydraulic suspension springs. In some embodiments, the suspension springs that provide the links between horizontal linkage 40 and the first and second trailing wheel arms 28, 30 can comprise pneumatic suspension springs.

As shown in FIG. 9, the vehicle 10 can comprise a pressurized air system 80. The horizontal linkage 40 can be linked to the first trailing wheel arm 28 by a first air suspension spring 90A and the horizontal linkage 40 can be linked to the second trailing wheel arm 30 by a second air suspension spring 90B. The first and second air suspension springs 90A, 90B, which can be pneumatic cylinders, can be connected to the pressurized air system 80 to adjust the rigidity of the first and second air suspension springs 90A, 90B to modify the ability of the first and second air suspension springs 90A, 90B to absorb instantaneous bumps experienced by the respective first and second rear wheels 24, 26. The pressurized air system 80 can comprise a compressor 82 which can compress air and feed it into an air tank 84. A pressure switch 86 can be used to transport air from the air tank 84 to the lines 88A, 88B which provides the air to the connection on the respective first and second air suspension springs 90A, 90B closest to the horizontal linkage 40. In the embodiment shown, at least a portion of the pressurized air system 80 is secured to a seat frame 15 of the frame 12 of the vehicle 10. The link between the first and second air suspension springs 90A, 90B and the horizontal linkage 40 can be similar the links between the horizontal linkage 40 and the tension links described above.

Figure 6:
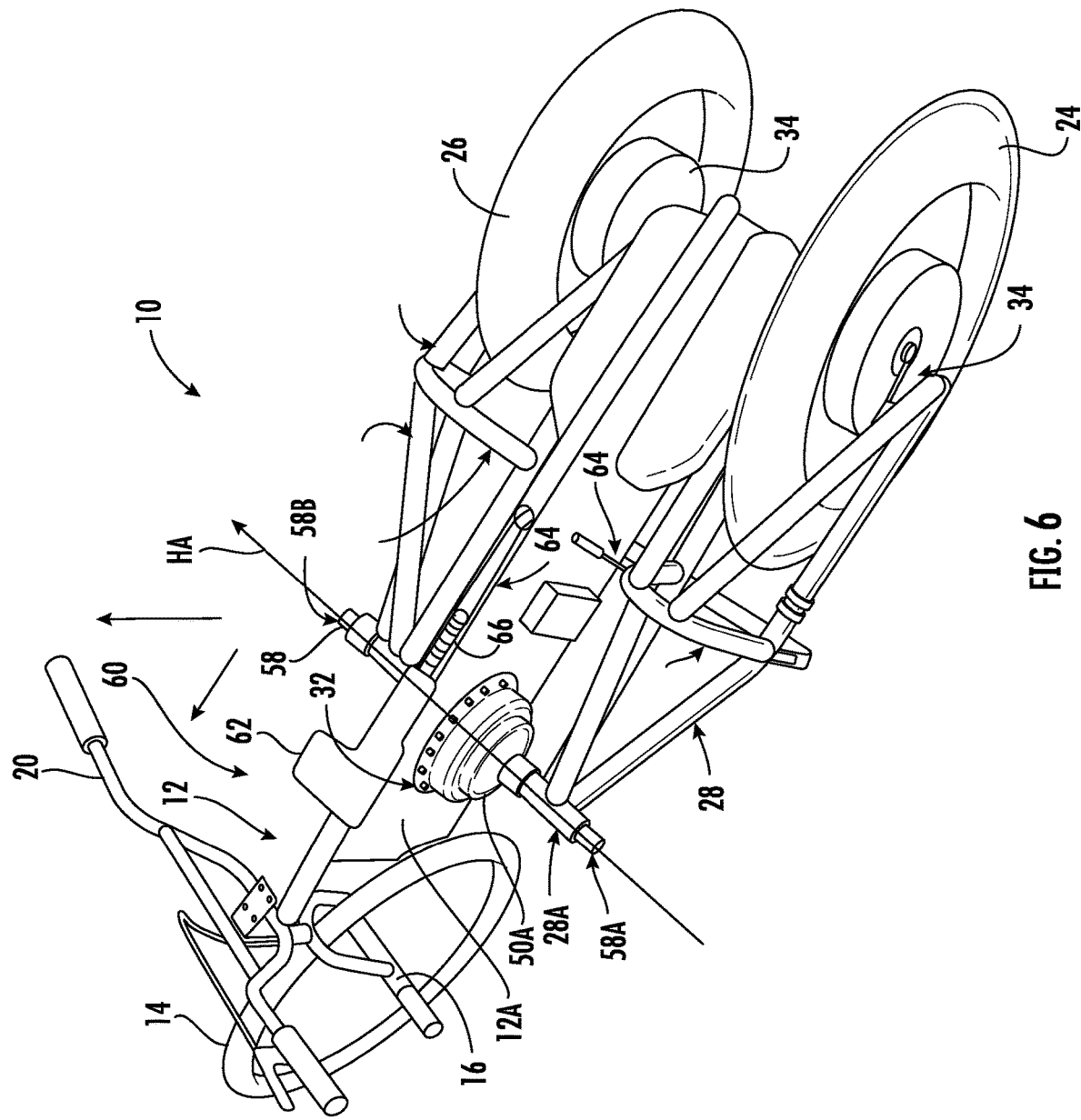
FIG. 6 illustrates a top perspective view of the embodiment of the transportation vehicle according to FIG. 1.

The central suspension joint 32 provides a rotatable connection between the frame 12 and the first and second trailing wheel arms 28, 30 and helps distribute and lessen torque placed on the frame and a transverse arm shaft of the central suspension joint 32 generated by the articulation of the first and second trailing wheel arms 28, 30 about the central suspension joint 32. To accomplish this task, the central suspension joint 32 can have a unique structure. In some embodiments as shown in FIGS. 1-6, the central suspension joint 32 can comprise a first central hub 50A secured to the first side 12A of the frame 12 and a second central hub 50B secured to the second side 12B of the frame 12. Each of the first and second central hubs 50A, 50B can have a wide base body 52A, 52B with a flange 54A, 54B extending around the outer perimeter of the base body 52A, 52B. Each of first and second central hubs 50A, 50B can have an aperture 56A, 56B extending through a middle of each of the first and second central hubs 50A, 50B. The first and second central hubs 50A, 50B can be aligned on the frame 12 such that the apertures 56A, 56B and the flanges 54A, 54B of the first and second central hubs 50A, 50B are aligned. The central suspension joint 32 can also comprise a transverse arm shaft 58 securely extending through the frame 12 and the apertures 54A, 54B of the first and second hubs 50A, 50B along an axis HA as shown in FIG. 6. The transverse arm shaft 58 can have a first side 58A extending out from the first central hub 50A on which the first trailing wheel arm 28 can be rotatably secured and a second side 58B extending out from the second central hub 50B on which the second trailing wheel arm 30 is rotatably secured. In particular, in some embodiments, the first trailing wheel arm 28 can have a sleeve 28A that is configured to slide on to and pivot about the first side 58A of the transverse arm shaft 58 and the second trailing wheel arm 30 can have a sleeve 30A that is configured to slide on to and pivot about the second side 58B of the transverse arm shaft 58. The first and second central hubs 50A, 50B can extend up to about the sleeves 28A, 30A of the respective sides of the transverse arm shaft 58. A fastener such as an end cap or a cotter pin can be used to prevent the unwanted or unintentional removal of the sleeves 28A, 30A from the transverse arm shaft 58.

The first and second hubs 50A, 50B can be secured to the respective sides 12A, 12B of the frame 12 at the flanges 54A, 54B. For example, a plurality of fasteners 55 can be used to secure the first and second hubs 50A, 50B to the respective sides 12A, 12B of the frame 12 at the flanges 54A, 54B. In some embodiments, the size and the number of fasteners 55 can vary and can be dependent upon the expected torque. For example, in some embodiments, the number of fasteners 55 can range between about 4 and about 30. in some embodiments, the number of fasteners 55 can be between about 6 and about 24. Without being held to any particular theory, it is believed that having a plurality of fasteners can facilitate the distribution of the torque placed on the frame 12 generated by the articulation of the first and second trailing wheel arms 28, 30.

Additionally, the base body 52A of the first central hub 50A and the base body 52B of the second central hub 50B can have diameters as measured at the flanges 54A, 54B that engage the frame 12 and hold the first and second central hubs 50A, 50B to the frame 12 that distribute and lessen the torque placed on the frame 12 and transverse arm shaft 58 by the articulation of the first and second trailing wheel arms 28, 30 about the transverse arm shaft 58. In some embodiments, the base bodies 52A, 52B of the first and second central hub 50A, 50B can have diameters as measured at the flanges 54A, 54B that are at least about three times a diameter of the transverse arm shaft 58. In some embodiments, the base bodies 52A, 52B of the first and second central hub 50A, 50B can have diameters as measured at the flanges 54A, 54B that are at least about five times a diameter of the transverse arm shaft 58. In some embodiments, the base bodies 52A, 52B of the first and second central hub 50A, 50B can have diameters as measured at the flanges 54A, 54B that are at least about ten times a diameter of the transverse arm shaft 58. In some embodiments, the base bodies 52A, 52B of the first and second central hub 50A, 50B can have diameters as measured at the flanges 54A, 54B that are about nine times a diameter of the transverse arm shaft 58.

In some embodiments, the central suspension joint can comprise a first central hub securable to the first side of the frame and a second central hub securable to the second side of the frame. The first central hub can comprise a base body with a flange extending around the outer perimeter of the base body and a first transverse arm shaft extending outward from a central portion of the first central hub. The second central hub can comprise a base body with a flange extending around the outer perimeter of the base body and a second transverse arm shaft extending outward from a central portion of the second central hub. The first and second central hubs can be positioned on the frame such that the flanges of the first and second central hubs are aligned to permit fasteners to fasten both the first and second central hubs together on the frame. Additionally, the first and second transverse arm shafts are aligned with each other along an axis. In such embodiments, the first trailing wheel arm can be rotatably secured to the first transverse arm shaft and the second trailing wheel arm can be rotatably secured to the second transverse arm shaft. As above, the base body of the first central hub and the base body of the second central hub can have diameters as measured at the flanges that engage the frame and hold the first and second central hubs to the frame to distribute and lessen a torque placed on the frame generated by the articulation of the first and second trailing wheel arms about the transverse arm shaft.

Figure 7:
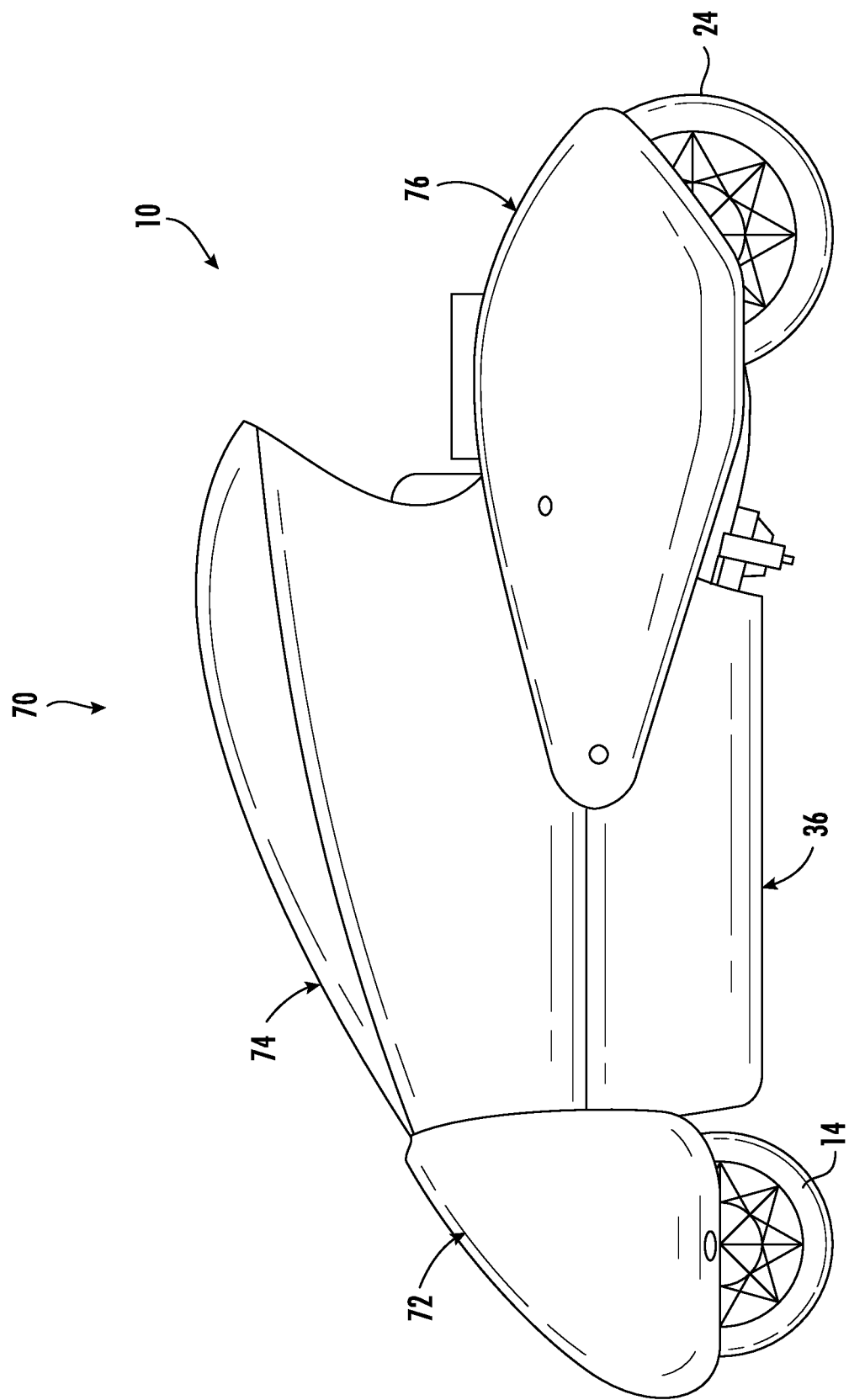
FIG. 7 illustrates a side plan view of the embodiment of the transportation vehicle according to FIG. 1 showing embodiments of fairings secured to the vehicle according to the present subject matter.

Referring to FIG. 7, to increase the usability of the vehicle 10, the frame 12 can be encased in a covering 70 to protect the user from the sun and inclement weather. For example, the vehicle 10 can comprise fairings 72, 74, 76 that may be optionally affixed to the frame 12. For instance, a nose cone 72 can be secured to the front fork 18 and a passenger fuselage, or upper frame fairing, 74 can be secured to the frame 12. The upper frame fairing 74 may move relative to the frame 12 via hinges or slides to facilitate operator access. Additionally, nacelle fairings 76 may be optionally affixed to the first and second trailing wheel arms 28, 30.

The vehicle 10 can operate with two distinct suspension modes. The unconstrained operational mode allows the vehicle to bank around corners, steered and trimmed mechanically by the physical and balancing inputs from the rider. The constrained operational mode forces the horizontal linkage 40 into a more rigid stance/posture such that the vehicle 10 behaves more like a traditional tricycle. The horizontal linkage 40 can be connected at its midpoint to the frame 12 as described above via a cradle joint 42 or a pintle that allows relative rotation about a fore-and-aft axis. To place the vehicle 10 in the constrained operational mode, the vehicle 10 can comprise a suspension lock system. For example, in the embodiment shown in FIGS. 1-6 and 8, the vehicle 10 can comprise a cable harness system 60 that applies tension on either side of the horizontal linkage 60 to constrain the relative rotation of the horizontal linkage 40 to the frame 12. The cable harness system 60 can comprise an actuator 62, a cable harness 64 and a cable binder 66. The tensioning of the cable harness system 60 can be affected by the actuator 62, which can be an electromechanical actuator, that applies tension to the cable harness 64. The direction of the tension in the elements of the Cable Harness is redirected by the use of cable sheaves 68 within the sheave block 65 which is fixedly attached to the frame 12.

Figure 8:
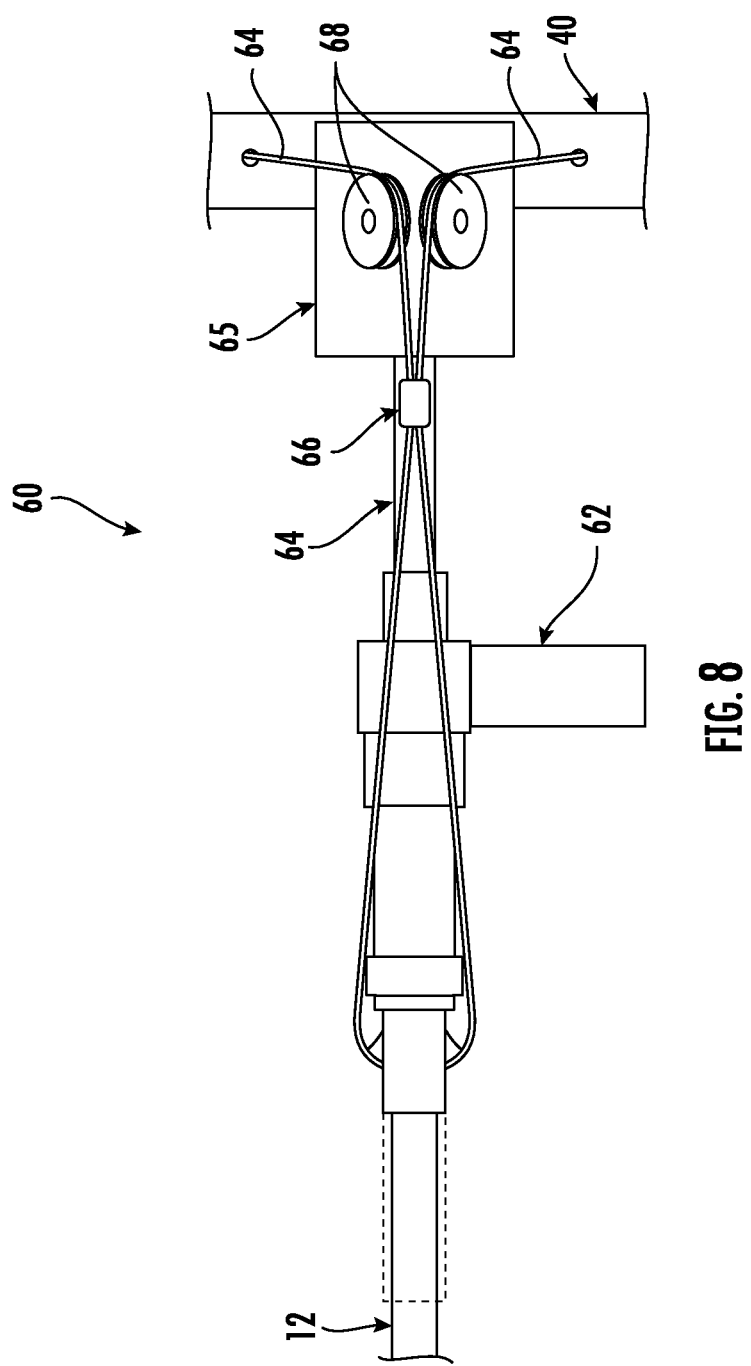
FIG. 8 illustrates a top plan view of an embodiment of suspension locking system that can be used in conjunction with a transportation vehicle according to the present subject matter.

Referring to FIG. 8, the cable harness system 60 can be used to constrain the tiling of the vehicle 10 when the vehicle 10 is travelling under a certain speed. In this manner, the cable harness system 60 can be used to force the vehicle upright and to behave as a tricycle. For example, when vehicle speed decreases to speed less than about 8 miles per hour, an electrical signal can be relayed from the hubmotor controller 39 to force the electromechanical actuator 62 to extend the cable harness 64. The actuator 62 can tension cable harness 64. A cable binder 66 can rigidly connect two sections of the cable harness 64 such that a loop is formed at the center of the cable harness 64. The electromechanical actuator 62 is rigidly mounted to frame 12 and controlled by an electrical signal relayed from the hubmotor controller 39. At speeds below a certain level, an actuator piston of the actuator 62 extends to apply tension to the center loop of the cable harness 64. Through the clamping action of the cable binder 66, both ends of the cable harness 64 can be in tension from the same direction. Each end of the Cable Harness passes through the sheave block 65, redirecting cable tension such that tension is applied between the horizontal linkage 40 and the rear dorsal area of the frame 12. The ends of the cable harness 64 can be affixed to the horizontal linkage 40 such that tension on the cable harness 64 constrains the relative rotation of horizontal linkage 40 to the frame 12. The cable binder 66 can work with the sheave block 65 to get the cable harness 64 to pull in the manner and direction desired.

Figure 10A:
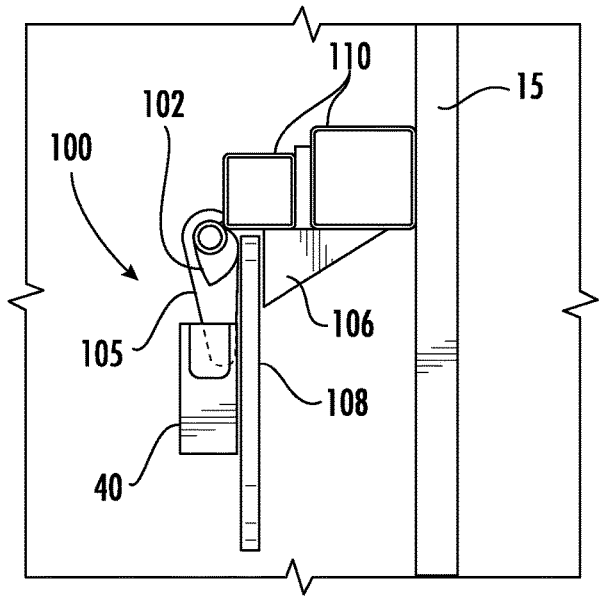
FIGS. 10A and 10B illustrate a schematic side views of an embodiment of suspension locking system that can be used in conjunction with a transportation vehicle according to the present subject matter.
Figure 10B:
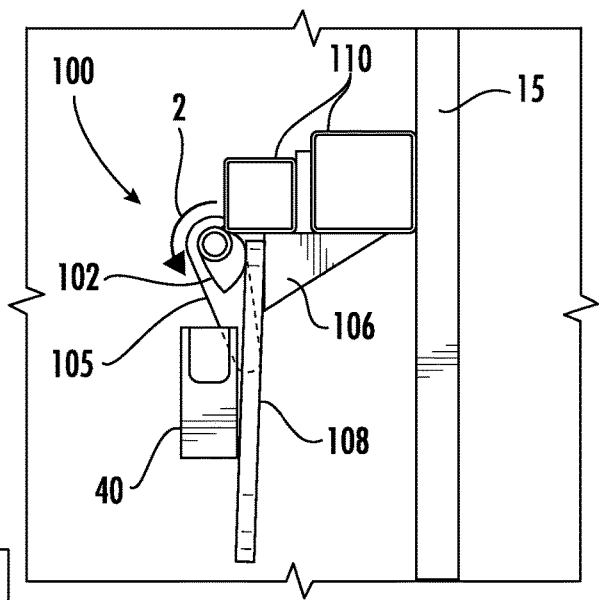
Figure 11:
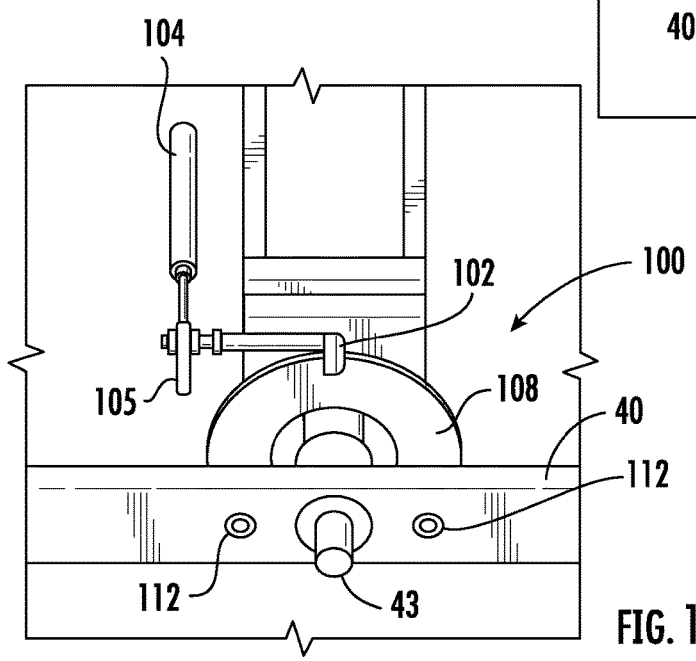
FIG. 11 illustrates a partial perspective view of the embodiment of suspension locking system according to FIGS. 10A and 10B that can be used in conjunction with a transportation vehicle according to the present subject matter.

In other embodiments, the vehicle 10 can comprise different suspension lock systems. For example, in some embodiments as shown in FIGS. 10A-11, the vehicle 10 can comprise a suspension lock system such as a cam clamp locking system 100. The cam clamp locking system 100 can comprise a rotatable cam 102 that can be connect to an actuating lever 104. The actuating lever 104 can be secured to the frame 12 such that the lever 104 is accessible between the legs of the user of the vehicle when the user is driving the vehicle 10. The lever 104 can rotate an actuator 105 which in turn rotates the cam 102 between a locked position and unlocked position. The cam clamp locking system 100 can comprise an opposing gusset 106 with a space between the cam 102 and the gusset 106. The cam clamp locking system 100 can also comprise a lock disc 108 secured to the horizontal linkage 40 by fasteners 112 shown in FIG. 11. Thereby, the lock disc 108, which can be in the shape of a full disc or a half disc, moves or pivots as the horizontal linkage 40 moves or pivots. The lock disc 108 can be positioned in the space between the cam 102 and the gusset 106. In operation, as lever 104 is pulled upward by the user, the actuator 105 rotates the cam 102. As the cam 102 is rotated, the cam 102 presses the lock disc 108 against the gusset 106 holding the lock disc 108 and horizontal linkage 40 in a stationary position for operating the vehicle 10 in the constrained operational mode. To revert to the unconstrained operational mode, the lever 104 can be lowered rotating the cam 102 back to its unlocked position and releasing the lock disc 108.

In this manner, the cam clamp locking system 100 provides a simple and effect way to lock the suspension of the rear wheels in a specific position in the constrained operational mode by simply pulling the lever 104 upward. The cam clamp locking system 100 can be activated when the horizontal linkage 40 is in an equilibrium state as show in FIG. 13A to place the vehicle 10 in the constrained operational mode. Additionally, the cam clamp locking system 100 can be activated when the horizontal linkage 40 is in a tilted state as show in FIG. 13B or 13C to place the vehicle 10 in the constrained operational mode while in the tilted state. Just as easily, the cam clamp locking system 100 can be deactivated to place the vehicle 10 in the unconstrained operational mode so that the horizontal linkage 40 and the vehicle 10 can freely shift between the equilibrium and tilted states.

Figure 13A:
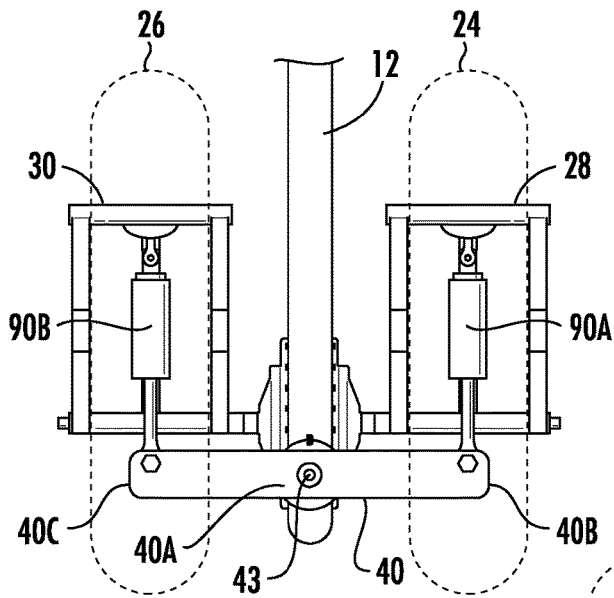
FIGS. 13A-13C illustrate schematic views of an embodiment of horizontal linkage in use on a transportation vehicle according to the present subject matter.
Figure 13B:
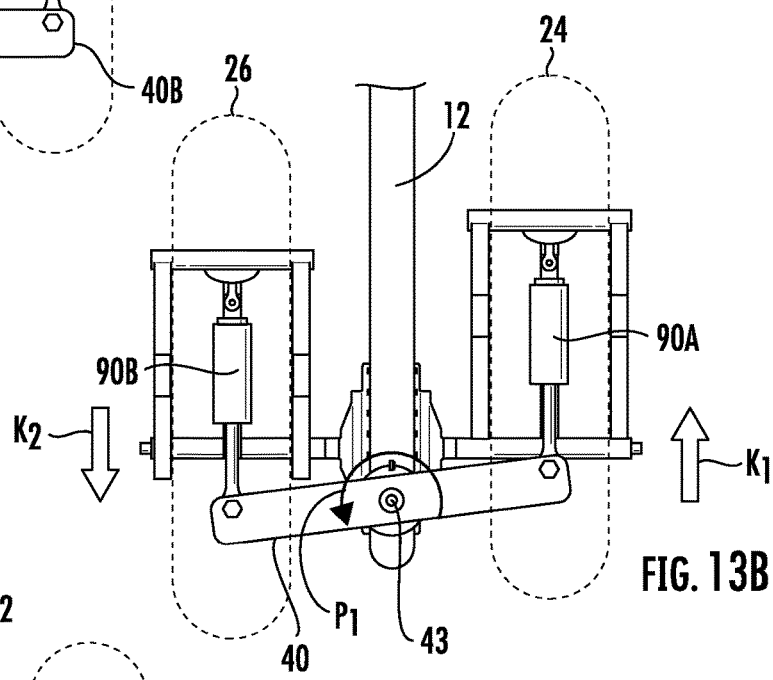
Figure 13C:
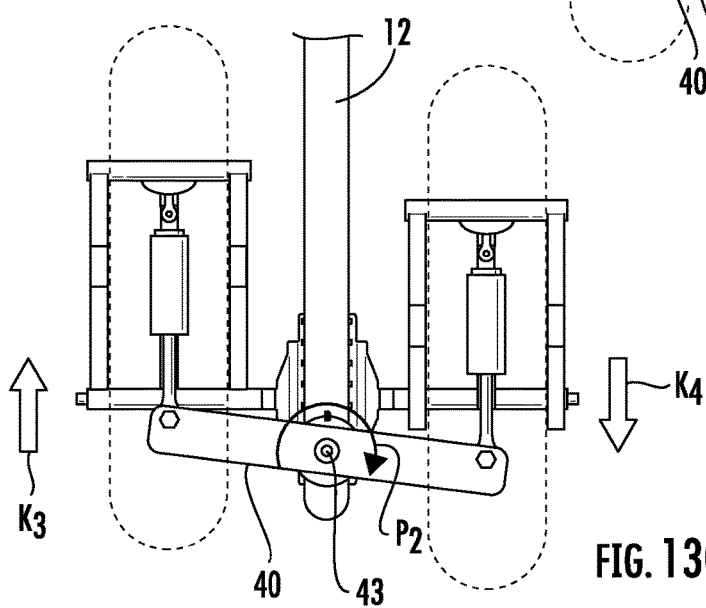

As shown in FIGS. 13A-13C, in the unconstrained operational mode, the vehicle can operate to some varying degree between the equilibrium and two tilted states. As the rear wheel 24 is forced to rotate upward in a direction $K_1$ as shown in FIG. 13B, the first end of the horizontal linkage 40 that is secured to an underside of the first trailing wheel arm is pulled upward causing the horizontal linkage 40 to pivot or rotate about the pintle 43 in a direction $P_1$. This, in turn, causing the second end of the horizontal linkage 40 that is secured to an underside of the second trailing wheel arm to be pulled downward such that the rear wheel 26 moves downward in the direction $K_2$ in an inversely proportional manner to the rear wheel 24. Similarly, as the rear wheel 26 is forced to rotate upward in a direction $K_3$ as shown in FIG. 13C, the second end of the horizontal linkage 40 that is secured to an underside of the second trailing wheel arm is pulled upward causing the horizontal linkage 40 to pivot or rotate about the pintle 43 in a direction $P_2$. This, in turn, causing the first end of the horizontal linkage 40 that is secured to an underside of the first trailing wheel arm to be pulled downward such that the rear wheel 24 moves downward in the direction $K_4$ in an inversely proportional manner to the rear wheel 26.

Figure 14A:
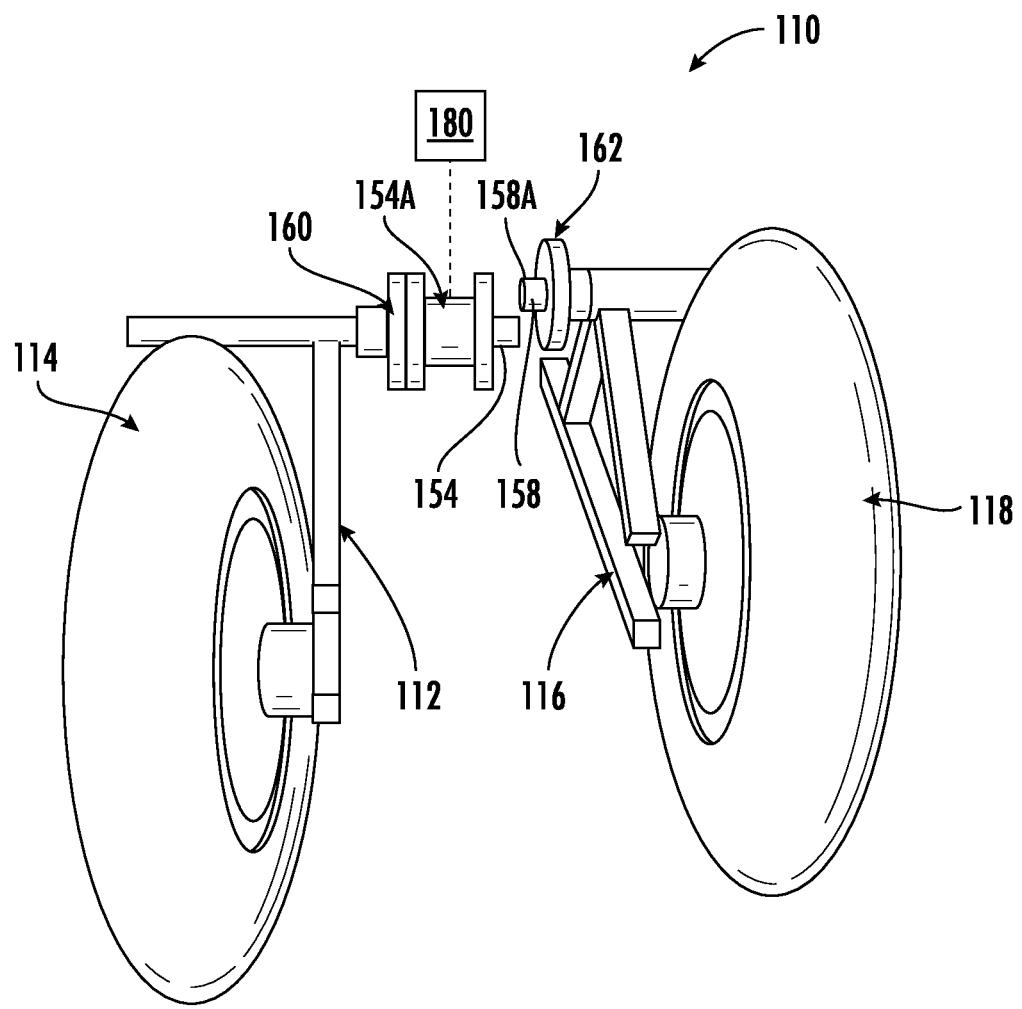
FIGS. 14A and 14B illustrate a schematic side views of another embodiment of suspension locking system that can be used in conjunction with a transportation vehicle according to the present subject matter.
Figure 14B:
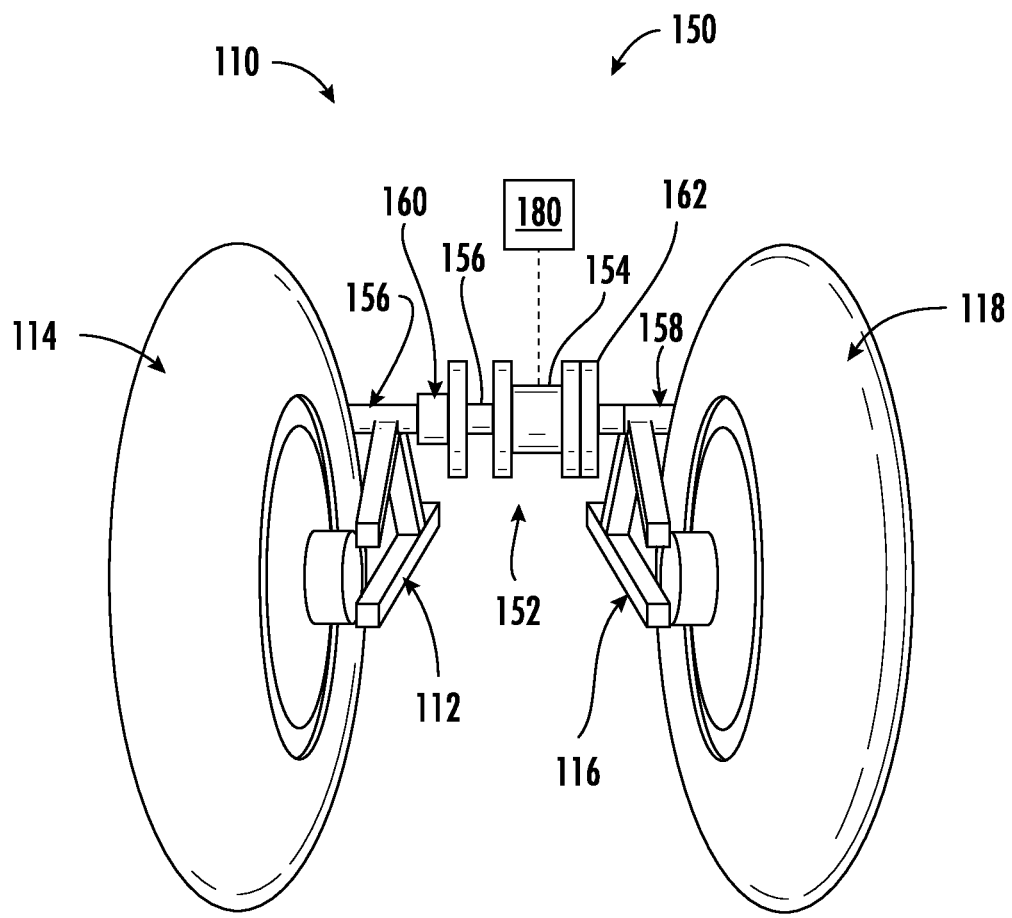
Figure 15:
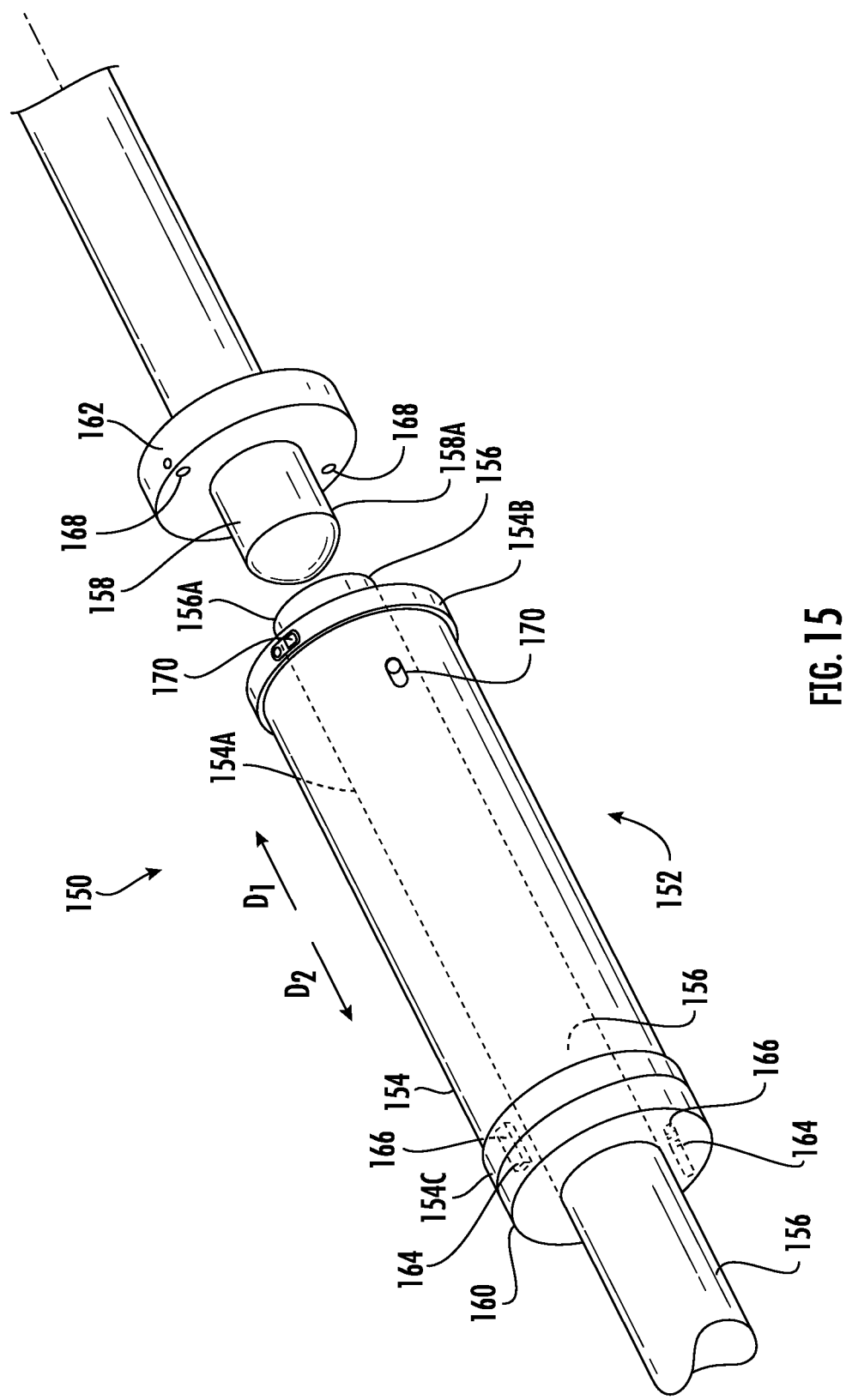
FIG. 15 illustrates a partial perspective view of the embodiment of suspension locking system according to FIGS. 14A and 14B that can be used in conjunction with a transportation vehicle according to the present subject matter.

Referring to FIGS. 14A-14B and 15, another embodiment of a suspension locking system 150 for a three-wheeled vehicle 110 (partially shown for clarity) can be provided. As shown and described in other embodiments above, the vehicle 110 can comprise a frame having a first side and second side and a front end and a rear end and a steerable front wheel secured to the front end of the frame. The vehicle 110 can comprise a first trailing wheel arm 112 having a first rear wheel 114 secure thereto and a second trailing wheel arm 116 having a second rear wheel 118 secure thereto. As shown and described in other embodiments above, the vehicle 110 can comprise a central suspension joint secured to the frame on which the first trailing wheel arm 112 and the second trailing wheel arm 116 are rotatably secured on either side of the frame. As above, a horizontal linkage can be provided that comprises a first end and a second end and a midsection between the first and second ends. The horizontal linkage can be pivotably connected to the frame at the midsection with the horizontal linkage linked to the first trailing wheel arm 112 between the first wheel and the central suspension joint proximal to the first end of the horizontal linkage as described above. Additionally, the horizontal linkage can be linked to the second trailing wheel arm 116 between the second wheel and the central suspension joint proximal to the second end of the horizontal linkage as described above.

As with other embodiments, the vehicle 110 can operate with two distinct suspension modes. The unconstrained operational mode allows the vehicle to bank around corners, steered and trimmed mechanically by the physical and balancing inputs from the rider. The constrained operational mode locks the first trailing wheel arm 112 and the second trailing wheel arm 116 in a relative position to one another so that the first and second rear wheels 114, 118 operate more like rear wheels on a traditional tricycle. When the suspension lock system 150 is in an unlocked position as shown in FIG. 14A, the vehicle 110 can operate in the unconstrained operational mode. The suspension lock system 150 can be configured to restrict the articulation of the first and second trailing wheel arms 112, 116 when in the constrained operational mode, i.e., when the suspension lock system 150 is in a locked position as shown in FIG. 14B so that the first and second rear wheels 114, 118 are locked in a relative position to one another.

In particular, the suspension lock system 150 can comprise a sliding shuttle system 152 that comprises a shuttle 154 that is slidably movable between a locked position as shown in FIG. 14B and an unlocked position as shown in FIG. 14A. For example, in some embodiments, the sliding shuttle system 152 can comprise a shuttle support member 156 that extends outward from the first trailing wheel arm 112 and a shuttle mount member 158 that extends outward from the second trailing wheel arm 116. The shuttle support member 156 and the shuttle mount member 158 can comprise a sturdy, rigid material, such as a metal or composite, and each can comprise a structure such as a bar, beam, billet, tube, rod, or the like, that is secured to the respective first and second rear wheels 114, 118. The shuttle support member 156 and the shuttle mount member 158 can be aligned to allow the shuttle 154 to engage the shuttle mount member 158 so that the shuttle 154 engages both the shuttle support member 156 and the shuttle mount member 158.

The shuttle 154 can be movably secured to the shuttle support member 156. For example, the shuttle 154 can shift from residing on the shuttle support member 156 only when the vehicle 110 is in the unconstrained operational mode to residing on both the shuttle support member 156 and the shuttle mount member 158 with the vehicle 110 is in the constrained operational mode. In some embodiments, the shuttle 154 can have an aperture 154A that extends through the shuttle 154 and the shuttle 154 can be slidably secured on the shuttle support member 156 with at least a portion shuttle support member 156 extending through the aperture 154A. The interior shape of the aperture 154A can be configured to fit the shape and size of perimeters of the respective shuttle support member 156 and shuttle mount member 158. When the shuttle support member 156 and the shuttle mount member 158 are aligned, the shuttle 154 can be slide toward the shuttle mount member 158 so that a portion of the shuttle mount member 158 can be received in the aperture 154A of the shuttle 154. When the shuttle 154 engages both the shuttle support member 156 and the shuttle mount member 158, the shuttle 154 is in a locked position with the first trailing wheel arm 112 and the second trailing wheel arm 116 locked in a relative position to one another as shown in FIG. 14B. When the shuttle 154 resides only on the shuttle support member 156, the shuttle 154 is in an unlocked position with the first trailing wheel arm 112 and the second trailing wheel arm 116 free to move independent from to one another as shown in FIG. 14A. Thus, by moving the shuttle 154, between the locked position and the unlocked position, the suspension mode of the vehicle 110 can be changed between the constrained operational mode and the unconstrained operational mode.

The shuttle 154 can be moved between the locked and unlocked positions in different manners. In some embodiments, the shuttle 154 can be moved between the locked position and the unlocked position manually. In some embodiments, shuttle 154 can be moved between the locked position and the unlocked position using an actuator 180. For example, in some embodiments, the actuator 180 can comprise a solenoid and controller that moves the shuttle 154 between the locked position and the unlocked position. In some embodiments, the actuator 180 can comprise a shifter that moves the shuttle 154 between the locked position and the unlocked position.

In some embodiments, the sliding shuttle system 152 can further comprise a first stationary collar 160 that can be positioned on the shuttle support member 156 that extends outward from the first trailing wheel arm 112 and a second stationary collar 162 that can be positioned on the shuttle mount member 158 that extends outward from the second trailing wheel arm 116. The first and second stationary collars 160, 162 can provide abutments for the shuttle 154 when it is moved between the locked position and the unlocked position. For example, when the shuttle 154 is moved to the unlocked position, the shuttle 154 can abut against the first stationary collar 160. When the shuttle 154 is moved to the locked position, the shuttle 154 can abut against the second stationary collar 162. The first and second first and second stationary collars 160, 162 can be secured on the respective shuttle support member 156 and shuttle mount member 158 in different manners.

In some embodiments, the sliding shuttle system 152 can also comprise magnets 164 and 168 within the first and second stationary collars 160, 162 and magnets 166 and 170 within first and second ends 154B, 154C of the shuttle 154. The magnets 164 in the first stationary collar 160 can engage with the magnets 166 in the first end 154B of the shuttle 154 to aid holding the shuttle 154 in the unlocked position. Alternatively, the magnets 168 in the second stationary collar 162 can engage with the magnets 170 in the second end 154C of the shuttle 154 to aid holding the shuttle 154 in the locked position. The magnets 164, 166, 168 and 170 can be puck-shaped magnets, for example. The magnets 164, 166, 168 and 170 can be strong magnets, such as Neodymium iron boron magnets. In some embodiments, the first and second ends 154B, 154C of the shuttle 154 can each comprise a collar into which indentions, or holes, can be bored into which, in turn, the magnets 166 and 170 can be secured. For example, the magnets 166 and 170 can be press fit or glued into the bored indentions, or holes in the collar shaped first and second ends 154B, 154C of the shuttle 154. Similarly, first and second stationary collars 160, 162 can have matching indentions, or holes, can be bored into which, in turn, the magnets 164 and 168 can be secured. For example, the magnets 164 and 168 can be press fit or glued into the bored indentions, or holes in first and second stationary collars 160, 162.

Thus, a three-wheeled vehicle is disclosed herein that can comprise a frame having a first side and second side and a front end and a rear end and a steerable front wheel secured to the front end of the frame. The three-wheeled vehicle can comprise a first trailing wheel arm having a first rear wheel secure thereto and a second trailing wheel arm having a second rear wheel secure thereto. Additionally, the three-wheeled vehicle can comprise a central suspension joint secured to the frame on which the first trailing wheel arm is rotatably secured, and the second trailing wheel arm is rotatably secured on either side of the frame. The three-wheeled vehicle can further comprise a horizontal linkage comprising a first end and a second end and a midsection between the first and second ends. The horizontal linkage can be pivotably connected to the frame at the midsection with the horizontal linkage linked to the first trailing wheel arm proximal to the first end of the horizontal linkage and the horizontal linkage linked to the second trailing wheel arm proximal to the second end of the horizontal linkage. The three-wheeled vehicle can comprise a suspension lock system configured to restrict the articulation of the first and second trailing wheel arms.

In some embodiments, the suspension lock system can comprise a sliding shuttle system that comprises a shuttle that is slidably movable between a locked position to an unlocked position. Further, in some embodiments, the sliding shuttle system can further comprise a shuttle support member that extends outward from the first trailing wheel arm on which the shuttle is moveable and a shuttle mount member that extends outward from the second trailing wheel arm. The shuttle support member on the first trailing wheel arm and the shuttle mount member that extends outward from the second trailing wheel arm can be aligned such that, when the shuttle is moved to the locked position, a portion of the shuttle extends over the shuttle mount member and a portion of the shuttle extends over a portion of the shuttle mount member. When the shuttle is moved to the unlocked position, the shuttle resides fully on the shuttle mount member that extends outward from the first trailing wheel arm.

In some embodiments, the sliding shuttle system can further comprise a first stationary collar positioned proximal an interior end of the shuttle support member that extends outward from the first trailing wheel arm and a second stationary collar positioned proximal an interior end of the shuttle mount member that extends outward from the second trailing wheel arm. When the shuttle is in the unlocked position, the shuttle abuts against the first stationary collar and, when the shuttle is in the locked position, the shuttle abuts against the second stationary collar. Additionally, the sliding shuttle system can further comprise magnets within the first and second stationary collars and magnets within first and second ends of the shuttle. The magnets in the first stationary collar can engage with the magnets in the first end of the shuttle to aid holding the shuttle in the unlocked position and the magnets in the second stationary collar can engage with the magnets in the second end of the shuttle to aid holding the shuttle in the locked position.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

These and other modifications and variations to the present subject matter may be practiced by those of ordinary skill in the art, without departing from the spirit and scope of the present subject matter, which is more particularly set forth herein above and any appending claims. In addition, it should be understood the aspects of the various embodiments may be interchanged either in whole or in part. Furthermore, those of ordinary skill in the art will appreciate that the foregoing description is by way of example only and is not intended to limit the present subject matter.

What is claimed is:

1. A three-wheeled vehicle comprising:
   a frame having a first side and second side and a front end and a rear end;
   a steerable front wheel secured to the front end of the frame;
   a first trailing wheel arm having a first rear wheel secure thereto and a second trailing wheel arm having a second rear wheel secure thereto;
   a central suspension joint secured to the frame on which the first trailing wheel arm is rotatably secured, and the second trailing wheel arm is rotatably secured on either side of the frame; and
   a horizontal linkage comprising a first end and a second end and a midsection between the first and second ends, the horizontal linkage being pivotably connected to the frame at the midsection with the horizontal linkage linked to the first trailing wheel arm between the first wheel and the central suspension joint proximal to the first end of the horizontal linkage and the horizontal linkage linked to the second trailing wheel arm between the second wheel and the central suspension joint proximal to the second end of the horizontal linkage.

2. The three-wheeled vehicle according to claim 1, wherein the horizontal linkage is secured to the frame by a connection on a pintle such that horizontal linkage is pivotable about the connection to the frame.

3. The three-wheeled vehicle according to claim 2, wherein as first trailing wheel arm articulates in a first direction, the horizontal linkage is pivoted about the connection to the frame causing the second trailing wheel arm to articulate in a second opposing direction.

4. The three-wheeled vehicle according to claim 1, wherein the horizontal linkage is secured to the frame at a position in which the horizontal linkage extends beneath the first and second trailing wheel arms.

5. The three-wheeled vehicle according to claim 1, wherein the horizontal linkage is linked to the first trailing wheel arm by a first tension link and the horizontal linkage is linked to the second trailing wheel arm by a second tension link.

6. The three-wheeled vehicle according to claim 1, wherein the horizontal linkage is linked to the first trailing wheel arm by a first suspension spring and the horizontal linkage is linked to the second trailing wheel arm by a second suspension spring.

7. The three-wheeled vehicle according to claim 1, further comprising a hubmotor on an axle of at least one of the first rear wheel or the second rear wheel to provide electric motive power to the three-wheeled vehicle.

8. The three-wheeled vehicle according to claim 7, further comprising one or more battery boxes secured to the three wheeled vehicle or carrying battery banks configured to provide electric power to the hubmotor.

9. The three-wheeled vehicle according to claim 1, further comprising a suspension lock system configured to restrict the articulation of the first and second trailing wheel arms.

10. The three-wheeled vehicle according to claim 9, wherein the suspension lock system comprises a sliding shuttle system that comprises a shuttle that is slidably movable between a locked position to an unlocked position.

11. The three-wheeled vehicle according to claim 10, wherein the sliding shuttle system further comprises a shuttle support member that extends outward from the first trailing wheel arm on which the shuttle is moveable and a shuttle mount member that extends outward from the second trailing wheel arm, the shuttle support member on the first trailing wheel arm and the shuttle mount member that extends outward from the second trailing wheel arm being alignable such that, when the shuttle is moved to the locked position, a portion of the shuttle extends over the shuttle mount member and a portion of the shuttle extends over a portion of the shuttle support member.

12. The three-wheeled vehicle according to claim 11, wherein the sliding shuttle system further comprises a first stationary collar positioned proximal an interior end of the shuttle support member that extends outward from the first trailing wheel arm and a second stationary collar positioned proximal an interior end of the shuttle mount member that extends outward from the second trailing wheel arm such that when the shuttle is in the unlocked position the shuttle abuts against the first stationary collar and when the shuttle is in the locked position, the shuttle abuts against the second stationary collar.

13. The three-wheeled vehicle according to claim 12, wherein the sliding shuttle system further comprises magnets within the first and second stationary collars and magnets within first and second ends of the shuttle such that the magnets in the first stationary collar are engageable with the magnets in the first end of the shuttle to aid holding the shuttle in the unlocked position and the magnets in the second stationary collar are engageable with the magnets in the second end of the shuttle to aid holding the shuttle in the locked position.

14. The three-wheeled vehicle according to claim 11, wherein the shuttle resides fully on the shuttle support member that extends outward from the first trailing wheel arm when the shuttle is in the unlocked position.

15. The three-wheeled vehicle according to claim 1, further comprising a hubmotor on axles of the front wheel, the first rear wheel, and the second rear wheel to provide all-wheel electric motive power to the three-wheeled vehicle.

16. A three-wheeled vehicle comprising:
a frame having a first side and second side and a front end and a rear end;
a steerable front wheel secured to the front end of the frame;
a first trailing wheel arm having a first rear wheel secure thereto and a second trailing wheel arm having a second rear wheel secure thereto;
a central suspension joint secured to the frame on which the first trailing wheel arm is rotatably secured, and the second trailing wheel arm is rotatably secured on either side of the frame; and
a horizontal linkage comprising a first end and a second end and a midsection between the first and second ends, the horizontal linkage being pivotably connected to the frame at the midsection with the horizontal linkage linked to the first trailing wheel arm proximal to the first end of the horizontal linkage and the horizontal linkage linked to the second trailing wheel arm proximal to the second end of the horizontal linkage;
a suspension lock system configured to restrict the articulation of the first and second trailing wheel arms, the suspension lock system comprises a sliding shuttle system that comprises a shuttle that is slidably movable between a locked position to an unlocked position.

17. The three-wheeled vehicle according to claim 16, wherein the sliding shuttle system further comprises a shuttle support member that extends outward from the first trailing wheel arm on which the shuttle is moveable and a shuttle mount member that extends outward from the second trailing wheel arm, the shuttle support member on the first trailing wheel arm and the shuttle mount member that extends outward from the second trailing wheel arm being alignable such that, when the shuttle is moved to the locked position, a portion of the shuttle extends over the shuttle mount member and a portion of the shuttle extends over a portion of the shuttle support member.

18. The three-wheeled vehicle according to claim 17, wherein the sliding shuttle system further comprises a first stationary collar positioned proximal an interior end of the shuttle support member that extends outward from the first trailing wheel arm and a second stationary collar positioned proximal an interior end of the shuttle mount member that extends outward from the second trailing wheel arm such that when the shuttle is in the unlocked position the shuttle abuts against the first stationary collar and when the shuttle is in the locked position, the shuttle abuts against the second stationary collar.

19. The three-wheeled vehicle according to claim 18, wherein the sliding shuttle system further comprises magnets within the first and second stationary collars and magnets within first and second ends of the shuttle such that the magnets in the first stationary collar are engageable with the magnets in the first end of the shuttle to aid holding the shuttle in the unlocked position and the magnets in the second stationary collar are engageable with the magnets in the second end of the shuttle to aid holding the shuttle in the locked position.

20. The three-wheeled vehicle according to claim 17, wherein the shuttle resides fully on the shuttle support member that extends outward from the first trailing wheel arm when the shuttle is in the unlocked position.

* * * * *